US010885779B2

(12) United States Patent
Malkes et al.

(10) Patent No.: US 10,885,779 B2
(45) Date of Patent: Jan. 5, 2021

(54) ADAPTIVE TRAFFIC CONTROL BASED ON WEATHER CONDITIONS

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/395,079

(22) Filed: Apr. 25, 2019

(65) Prior Publication Data
US 2019/0333375 A1    Oct. 31, 2019

Related U.S. Application Data

(60) Provisional application No. 62/664,025, filed on Apr. 27, 2018.

(51) Int. Cl.
G08G 1/07 (2006.01)
G08G 1/01 (2006.01)
G01W 1/10 (2006.01)

(52) U.S. Cl.
CPC ............ *G08G 1/07* (2013.01); *G01W 1/10* (2013.01); *G08G 1/0129* (2013.01); *G08G 1/0145* (2013.01); *G01W 2203/00* (2013.01)

(58) Field of Classification Search
CPC ...... G08G 1/07; G08G 1/0129; G08G 1/0145; G01W 1/10; G01W 2203/00
See application file for complete search history.

(56) References Cited

U.S. PATENT DOCUMENTS

| 6,317,058 | B1 | 11/2001 | Lemelson et al. |
| 6,937,161 | B2 | 8/2005 | Nishimura |
| 8,040,254 | B2 | 10/2011 | Delia et al. |
| 8,090,524 | B2 | 1/2012 | Chapman et al. |
| 8,521,426 | B2 | 8/2013 | Kelly et al. |
| 9,098,654 | B2 | 8/2015 | Mewes et al. |
| 9,430,942 | B2 | 8/2016 | Blandin et al. |
| 9,965,951 | B1* | 5/2018 | Gallagher ............ G08G 1/0133 |
| 2002/0181739 | A1 | 12/2002 | Hallowell et al. |
| 2011/0121993 | A1* | 5/2011 | Davis ..................... G08G 1/07 340/911 |
| 2015/0212236 | A1* | 7/2015 | Haas ..................... G01W 1/10 382/100 |

FOREIGN PATENT DOCUMENTS

EP    2913809 B1    6/2017

* cited by examiner

Primary Examiner — James J Yang
(74) Attorney, Agent, or Firm — Kilpatrick Townsend & Stockton, LLP

(57) ABSTRACT

A current or forecasted weather condition at an intersection or roadway may be identified using cameras and/or other weather sensors connected with traffic infrastructure installed at the intersection or roadway. Adverse traffic events typically associated with weather conditions of the same type as the identified weather condition may be determined, for example based on historical records of correlations between weather and traffic. The traffic infrastructure may adjust an option, for example by adjusting traffic signal timings, to mitigate the adverse traffic event in response to identifying the weather condition.

20 Claims, 12 Drawing Sheets

ADAPTIVE TRAFFIC CONTROL BASED ON WEATHER CONDITIONS

CROSS-REFERENCE TO RELATED APPLICATIONS

The present disclosure claims the priority benefit of U.S. provisional application 62/664,025 filed Apr. 27, 2018 and titled "A System and a Method for Adaptive Traffic Control Based on Weather Conditions," the disclosure of which is incorporated herein by reference.

BACKGROUND OF THE INVENTION

1. Field of the Disclosure

The present disclosure generally relates to a system and method for adaptive traffic control, and particularly relates to a system and method for controlling traffic flow based on weather conditions.

2. Description of the Related Art

Ever-increasing traffic has been a serious problem faced by drivers as travel times have considerably increased due to increased traffic. In peak hours, existing infrastructure fails to cope with heavy traffic, leading to long traffic jams or car accidents. Furthermore, traffic situations, such as pedestrian movement at intersections, emergency vehicle movement, or road accidents may also affect the movement of traffic. In addition, at busy intersections of roads, traffic movement remains congested for most of the time.

The weather also plays a critical role in movement of traffic. Adverse weather conditions may nearly bring traffic to a halt. Since, climate varies from place to place, weather may affect traffic in various locations differently, for example, some locations may be prone to heavy rain, while other locations may receive moderate rainfall. Similarly, some locations may be more prone to snowfall. Besides affecting traffic movement, extreme weather conditions may also cause accidents. During instances of rain, visibility of a driver is generally lowered, which may lead to traffic congestion as well as accidents. Similarly, in cases of snowfall, road surfaces may become slippery causing vehicles to skid.

There is a need for adapting traffic control systems for different weather conditions.

DETAILED DESCRIPTION

A current or forecasted weather condition at an intersection or roadway may be identified using cameras and/or other weather sensors connected with traffic infrastructure installed at the intersection or roadway. Adverse traffic events typically associated with weather conditions of the same type as the identified weather condition may be determined, for example based on historical records of correlations between weather and traffic. The traffic infrastructure may adjust an option, for example by adjusting traffic signal timings, to mitigate the adverse traffic event in response to identifying the weather condition.

Figure 1:
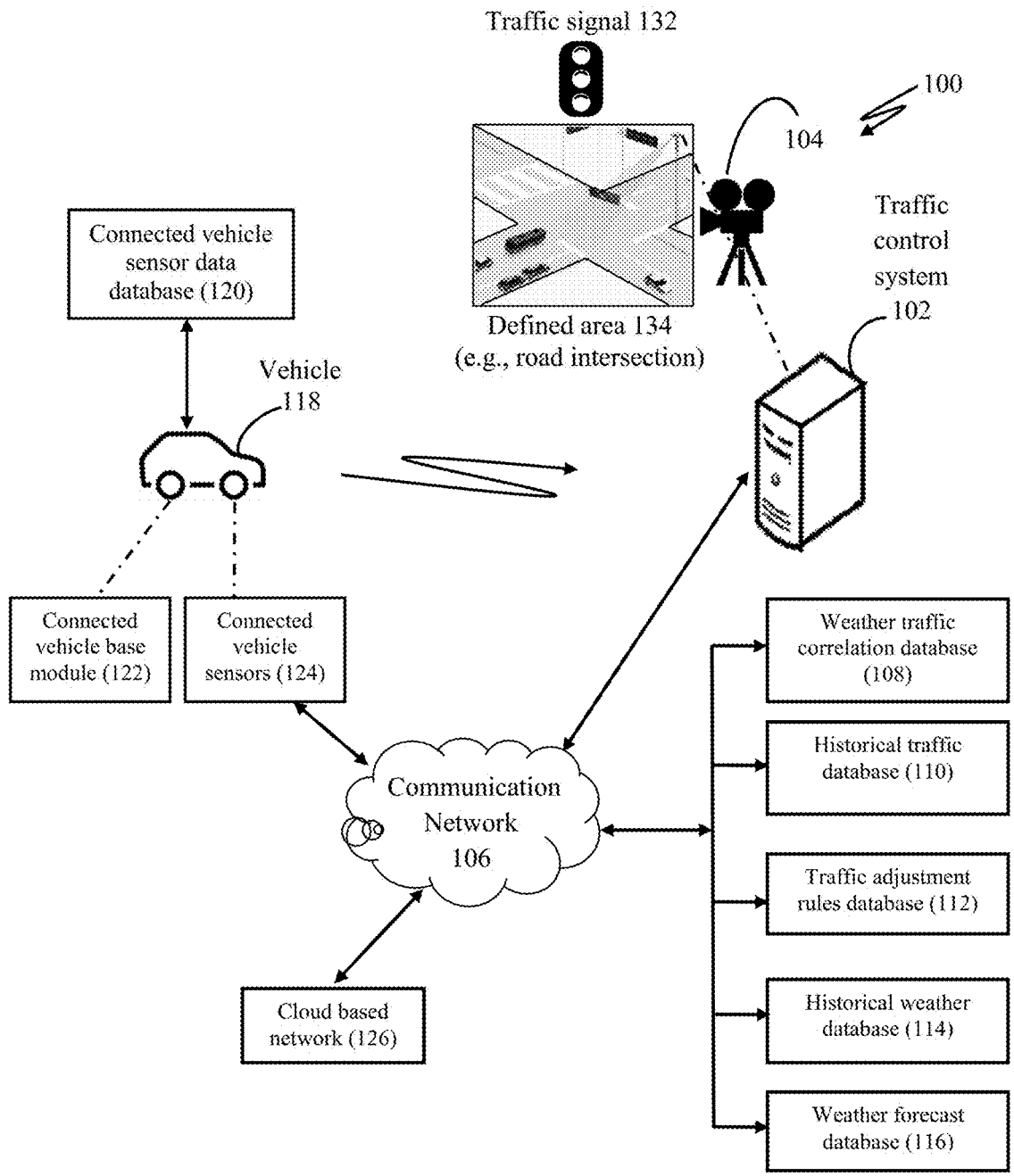
FIG. 1 illustrates an exemplary network architecture of a smart traffic control system for adaptive traffic control based on weather conditions.

FIG. 1 illustrates a network architecture of a smart traffic control system 102 for adaptive traffic control based on weather conditions.

The traffic control system 102 may be connected with and/or may be implemented in a traffic cabinet present at a roadway or intersection of roads. One or more cameras 104 may also be connected to, communicatively coupled to, and/or affixed/mounted to the traffic signal 132, as shown in FIG. 1. The camera 104 may be configured to capture visual media data of a defined area 134 along one or more thoroughfares and any vehicular traffic thereon. That is, the camera 104 may capture images or videos of a defined area 134 of roadway or intersection and any vehicles that pass through the defined area 134.

Cameras 104 may be visible light cameras, infrared/thermal cameras, ultraviolet cameras, cameras sensitive to any other range along the electromagnetic spectrum, night vision cameras, or a combination thereof. The cameras 104 as referred to herein may also include range measurement devices, such as light detection and ranging (LIDAR) transceivers, radio detection and ranging (RADAR) transceivers, electromagnetic detection and ranging (EmDAR) transceivers using another range along the electromagnetic spectrum, sound detection and ranging (SODAR) transceivers, sound navigation and ranging (SONAR) transceivers, or combinations thereof. The cameras 104 and/or range measurement devices may be used to measure positions and/or speeds of vehicles along the thoroughfare(s) within the defined area 134. The sensors of the traffic control system 102 may also include a Visual Average Speed Computer And Recorder (VASCAR) sensor or other sensor for tracking locations and/or speeds of vehicles.

In some cases, the defined area may change, as the camera 104 may move, for example by "sweeping" back and forth when the camera rotates about at least one axis. The visual media data may relate to images or video captured by the camera 104. The intersection referred herein connotes to the intersection of roads, railways, waterways, airways, or other thoroughfares. The traffic control system 102 may be referred to as a traffic infrastructure device, or a traffic control traffic infrastructure device, or a traffic infrastructure control device, or a traffic control infrastructure, a traffic infrastructure control device, an infrastructure device, or any combination of those terms.

The traffic control system 102 may be connected to or coupled to a communication network 106, such as the Internet. The system 102 may further be connected to a weather traffic correlation database 108 for identifying weather conditions that are known to be correlated with adverse traffic conditions, such as accidents, delays, slowdowns, standstills, congestion, traffic jams, road damage, or combinations thereof along the thoroughfare or an intersecting/adjacent thoroughfare, at or near the defined area 134. The system 102 may further be connected to a historical traffic database 110 which may store data related to past accidents and traffic delays at different thoroughfares (e.g., at different roadways and/or intersections). The traffic control system 102 may further be connected to a traffic adjustment rules database 112 for storing standard rules relating to adjustments taken to control the traffic in different traffic conditions. The system 102 may further be connected to a historical weather database 114 which stores the sensor data collected from different weather sensors installed at traffic cabinets. The system 102 may further be connected to a weather forecast database 116 or other weather forecast data source which stores and/or provides retrievable weather-related data, such as a news organization, a government agency such as the National Weather Service (NWS) or National Oceanic and Atmospheric Administration (NOAA), a weather forecasting organization like AccuWeather®, or a combination thereof.

Further shown in FIG. 1, is a vehicle 118 approaching the camera 104 at the intersection. The vehicle 118 may comprise a connected vehicle sensor database 120 which contain sensor data obtained from connected vehicle sensors 124 and a connected vehicle base module 122 which continuously polls the connected vehicle sensors 124 for vehicle sensor data, such as when the vehicle 116 may have its breaks engaged. In some cases, the vehicle 118 and traffic control system 102 may communicate with each other via vehicle-to-vehicle (V2V), vehicle-to-infrastructure (V2I), and/or infrastructure-to-vehicle (I2V) communications with other devices around, for example using dedicated short range communication (DSRC) wireless signal transfer or another wireless signal transfer protocol or technology discussed herein with respect to the input devices 1160 and/or output devices 1150 of FIG. 11.

The communication network 106 may also be connected to a cloud-based network 126. One or more embodiments may be implemented in the cloud-based network 126, for example, one or more databases may be implemented in the cloud-based network 126. The communication network 106 may be a wired and/or a wireless network, but preferably a wireless network. The communication network 106, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, any other wired or wireless communication network or technology discussed with respect to the input devices 1160 and/or output devices 1150 of FIG. 11, other communication techniques, or a combination thereof.

An example of the historical traffic database 110 is presented in Table 1 presented below. Table 1 shows records containing details related to past adverse traffic events at an intersection/road. The intersection/road may be identified by a unique ID assigned to the intersection/road. In the table, the intersection/road ID is shown in the header portion of the table, which is followed by the current date. A first column has a field "Date" which indicates the date of entry in the record. Alternatively, the date may be the date of occurrence of the adverse traffic event. A next field "Traffic Event" indicates the type of adverse traffic event, such as an accident, a delay or congestion. A third field "Event Category" indicates the category of the adverse traffic event. For example, the adverse traffic events may be categorized based on severity of the adverse traffic events. The major accidents may be categorized under severe category, while minor accidents having no associated fatal injuries may be categorized under mild category. The severity of the adverse traffic events may help to take proportionate action proactively to avoid such instances in future. The fourth field "Frequency/day" indicates total occurrences of the adverse traffic events in a day. In the table, the frequency is calculated for a day, however, time period for recoding the adverse traffic events may be based on change in weather condition.

TABLE 1

Intersection/Road ID - XXX | Current Date - Oct. 20, 2016

| Date | Traffic Event | Event Category | Frequency/day |
|---|---|---|---|
| Jan. 1, 2016 | Accidents | Severe | 1 |
| Jan. 2, 2016 | Delay > 10 min | Mild | 3 |
| Jan. 3, 2016 | Delay > 10 min | Severe - 25 min delay | 4 |
| Jan. 4, 2016 | Delay > 10 min | Mild | 2 |
| Jan. 5, 2016 | Accidents | Mild | 2 |
| . . . | | | |
| Dec. 31, 2016 | Accidents | Severe | 4 |

An example of the historical weather database 114 is presented in Table 2 presented below. Table 2 provides details related to weather conditions, as determined by weather sensors. The data may be specific for an intersection/road, wherein the intersection/road may be identified by a unique ID assigned to it. The header portion of the table may have the intersection/road ID followed by the current date. A first field in the table is "Date" indicates the date of recording the weather condition. A second field "Precipitation" indicates the weather condition, such as rain or snow. A third field indicates another weather condition, humidity in this example, and a fourth field indicates temperature.

TABLE 2

Intersection/Road ID - XXX | Current Date - Oct. 20, 2016

| Date | Precipitation (mm) | Humidity (gm/cm^3) | Temperature (degree Celsius) |
|---|---|---|---|
| Jan. 1, 2016 | Rain -23 mm | 14 | 23 |
| Jan. 2, 2016 | Rain - 45 mm | 17 | 19 |

TABLE 2-continued

Intersection/Road ID - XXX | Current Date - Oct. 20, 2016

| Date | Precipitation (mm) | Humidity (gm/cm^3) | Temperature (degree Celsius) |
|---|---|---|---|
| Jan. 3, 2016 | No Precipitation | 23 | 27 |
| Jan. 4, 2016 | No Precipitation | 45 | 28 |
| Jan. 5, 2016 | Snow - 10 mm | 9 | −5 |
| ... | | | |
| Oct. 19, 2016 | No Precipitation | 18 | 19 |

An example of data stored in the weather forecast database 116 is presented in Table 3 provided below. A record in the database may be identified by an intersection/road ID to which the record pertains. The intersection/road ID is shown in a header portion of table 3, followed by a current date. Fields present in the table 3 are similar to table 2, however, data present in table 3 relate to weather forecast. Such data related to weather forecast may be obtained from a third party database or a service, such as a news organization, a government agency such as the National Weather Service (NWS) or National Oceanic and Atmospheric Administration (NOAA), a weather forecasting organization like AccuWeather®, or a combination thereof. The forecast database may be used for determining a weather condition around the intersection, when the weather condition cannot be determined by weather sensor data.

TABLE 3

Intersection/Road ID - XXX | Current Date - Oct. 20, 2016

| Date | Precipitation | Humidity (gm/cm^3) | Temperature (degree Celsius) |
|---|---|---|---|
| Oct. 21, 2016 | No Precipitation | 14 | 21 |
| Oct. 22, 2016 | No Precipitation | 17 | 19 |
| Oct. 23, 2016 | Rain - 5 mm | 27 | 19 |
| Oct. 24, 2016 | No Precipitation | 32 | 25 |
| Oct. 25, 2016 | No Precipitation | 34 | 23 |
| ... | | | |
| Jan. 1, 2017 | Snow - 8 mm | 12 | −6 |

An exemplary embodiment of data stored in the weather traffic correlation database 108 is shown in Table 4 as provided below. A first field is "ID" indicative of a unique ID generated for an entry in table 4. A second field is a "Traffic Cabinet ID" which indicates a unique ID of a traffic cabinet to which the entry pertains. Third and fourth fields indicate weather attributes. The weather attributes may be represented in the form of type of weather condition (such as snow, rain, humidity etc.) and parameter that groups the quantitative values associated with the weather conditions into grouped parameters. A fifth field in columns five and six, represents an adverse traffic event associated with the weather attribute. The fifth column indicates type of the adverse traffic event and the sixth column indicates an event category. For example, snow at an intersection X123 is associated with the event type "Accidents" and the event category "Severe" as the accident caused fatal injuries. A last column contains a field "correlation coefficient". The correlation coefficient is based on the weather attributes and the traffic event. The value of correlation coefficient may be continuously updated by a weather traffic correlation module 216 based on a historical traffic database 110 and a historical weather database 114 for new events that are detected by the weather traffic correlation module 216. For example, a value 0.82 of correlation coefficient indicates a high correlation of snow with accidents whereas a value 0.2 of correlation coefficient indicates a weak correlation of humidity with delay categorized as mild.

TABLE 4

| ID | Traffic Cabinet ID | Weather Attribute | | Traffic Event Type | | Correlation Coefficient |
|---|---|---|---|---|---|---|
| | | Type | Parameter | Event Type | Event category | |
| 1 | X123 | Snow/Ice | 1-10 mm | Accidents | Severe | 0.82 |
| 2 | A345 | Snow/Ice | 1-10 mm | Delay > 10 min | Mild | 0.67 |
| 3 | C567 | Rain | 25-50 mm | Delay > 10 min | Mild | 0.45 |
| 4 | F876 | Humidity | 10-20 g/cm^3 | Delay > 10 min | Mild | 0.2 |
| 5 | O876 | Rain | 25-50 mm | Accidents | Severe | 0.786 |
| 6 | H543 | Rain | 50-100 mm | Accidents | Mild | 0.91 |
| ... | | | | | | ... |
| N | J897 | Snow/Ice | 1-10 mm | Accidents | Severe | 0.849 |

An exemplary embodiment of data stored in the traffic adjustment rule database 112 is shown in Table 5 provided below. It may contain standard rules for adaptive traffic control based on a weather condition. Column one represents "Traffic Cabinet ID" which uniquely identifies the traffic cabinet to which the entry pertains. Column two represents the weather condition, such as snow, rain or ice. Third column denotes severity of a weather condition, such as mild, moderate or severe. Fourth column indicates smart traffic control operation adjustment. The smart traffic control operation adjustment may be based on standard rules, known in the art, for optimizing operation of a traffic signal in different traffic conditions. For example, increasing duration of yellow light, and increasing delay between when the light in one direction turns red and when light in the other direction is switched to green. These two actions may give drivers more time to stop (increased yellow light time) and more time to clear the intersection (increased red to green light delay). Last column indicates the local adjustment, which denotes a percentage increase in the smart traffic control operation adjustment. In one case, the percentage increases by one for each skid detected by the vehicle calibration module 212 at that intersection in that weather condition/severity. In alternate embodiments, severity and cause of the skid may be considered, and local adjustment is non-linear in that a severe skid that was not the driver's fault may result in a larger local adjustment than a minor skid, or both components may be considered.

TABLE 5

| Traffic Cabinet ID | Condition | Condition Severity | Smart Traffic Control Operation Adjustment | Local Adjustment |
|---|---|---|---|---|
| X123 | Snow | Mild | Increase yellow duration 10% and increase red to green delay by 2 seconds | +1% |
| X123 | Ice | Severe | Increase yellow duration 20% and increase red to green delay by 5 second | +9% |
| X123 | Rain | Moderate | Increase yellow duration 5% | NA |
| ... | | | | |
| X123 | Snow | Moderate | Increase yellow duration 15% and increase red to green delay by 3 seconds | +7% |
| A345 | Rain | Moderate | Increase yellow duration 5% | NA |

Figure 2:
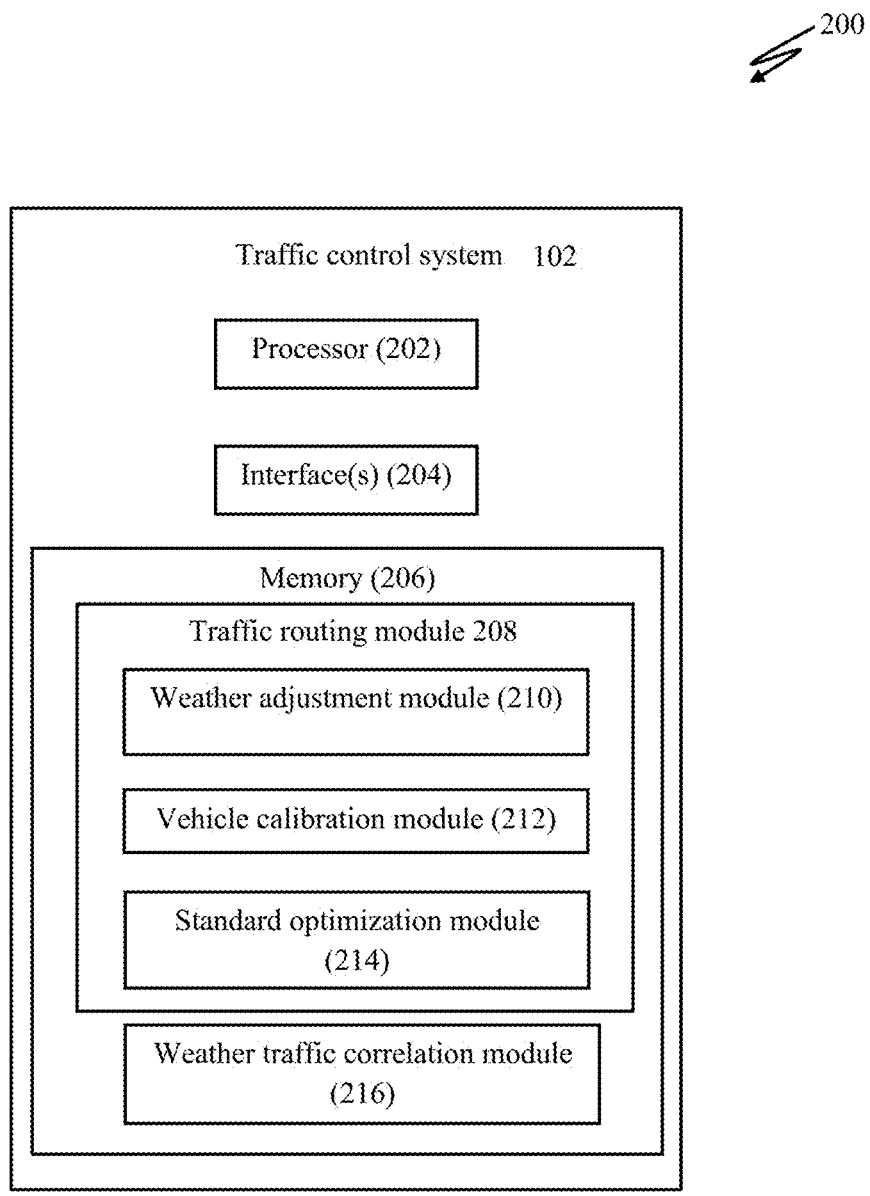
FIG. 2 is a block diagram illustrating different components of an exemplary traffic control system.

FIG. 2 is a block diagram illustrating different components of the traffic control system.

A system and method may be provided of adaptive traffic control based on data related to weather condition. The data related to weather condition may be obtained from multiple weather sensors installed at various intersections. Moreover, the data related to weather condition may also be obtained from visual data captured by a smart traffic control camera 104. In addition, the system 102 may receive visual data in form of images or video from the camera 104. Images or videos captured by the camera may be processed for determining local weather conditions. Image processing algorithms, such as edge detection, may be used to determine weather conditions such as snow, rain, dry conditions etc. from the visual data. Moreover, parameters, such as snow-depth on the roads can be determined from the visual data. The system 102 may use a single 360-degree omni-directional camera 104, or a plurality of cameras 104 integrated into a fashion such that complete area 134 surrounding the traffic signal 132 and/or in which the traffic signal 132 operates may be captured by the camera(s) 104. The advantage of using camera 104 is that it may be used (via image and/or feature and/or object detection algorithms) for detecting traffic conditions, such as accidents, delays, slowdowns, standstills, congestion, traffic jams, road damage, or combinations thereof along the thoroughfare or an intersecting/adjacent thoroughfare, at or near the defined area 134. The camera(s) 104 may also be utilized (via image and/or feature and/or object detection algorithms) as sensors for detection of local weather conditions, such as rain, snow, sleet, hail, ice, floods, mud, fog, and so forth. Weather conditions may include precipitation, such as rain, acid rain, snow, sleet, fog, or hail, that affect visibility for drivers and that may result in substances cover a thoroughfare such as a roadway or railway and cause adverse traffic issues by affecting tire traction. Weather conditions may also include substances, such as ice, black ice, snow, mud, rocks, water, toxic runoff, or combinations thereof that cover at least part of a thoroughfare such as a roadway or railway and cause adverse traffic issues by reducing or otherwise affecting tire traction or other surface traction for vehicles. Weather conditions may include combinations of such issues, such as in storms or hurricanes or monsoons. Weather conditions in the context herein may also include issues such as high winds, landslides, mudslides, avalanches, floods, toxic spills, or combinations thereof, which may affect ability of vehicles to operate properly or ability of drivers to operate vehicles properly. Alternatively, weather related parameters, such as temperature, wind speed, humidity, and atmospheric pressure may be calculated with help of weather sensors, such as thermometer and wind meter.

The system 102 may analyze a current weather condition and a current traffic condition at different intersections for optimizing the traffic control. The system 102 may allow comparison between outcomes of the analysis with a similar situation that occurred in the past. For example, a weather condition similar to the current weather condition may be known to increase probability of skidding of the vehicle 118. Based on an outcome of the comparison, the system 102 may take appropriate steps to avoid recurrence of the adverse traffic event. For example, in case of snow, it was determined that the snow caused road surface to become slippery resulting in severe accidents. In such condition, the system 102 may adjust the traffic timings to provide more time for crossing the intersection. The visual data may be used to determine the current traffic condition at the intersection and adjustments to the traffic timings may be made according to the current traffic condition.

The system 102 of FIG. 2 comprises a processor 202, an interface(s) 204, and a memory 206. The processor 202 may execute an algorithm stored in the memory 206 for adaptive traffic control. The processor 202 may also be configured to decode and execute any instructions received from one or more other electronic devices or server(s). The processor 202 may include one or more general-purpose processors 202 (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 202 may be configured to execute one or more computer-readable program instructions, such as program instructions to carry out any of the functions described in this description. The processor 202 may alternately or additionally be or include any processor 1110 as illustrated in and discussed with respect to FIG. 11.

The interface(s) 204 may help an operator to interact with the system 102. The interface(s) 204 of the system 102 may either accept an input from the operator or provide an output to the operator, or may perform both the actions. The interface(s) 204 may either be a Command Line Interface (CLI), Graphical User Interface (GUI), or a voice interface. The interface(s) 204 may alternately or additionally be or include any input devices 1160 and/or output devices 1150 and/or display systems 1170 and/or peripherals 1180 as illustrated in and discussed with respect to FIG. 11.

The memory 206 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The memory 206 may alternately or additionally be or include any memory 1120, mass storage 1130, and/or portable storage 1140 as illustrated in and discussed with respect to FIG. 11.

The memory 206 may comprise modules implemented as a program. In one case, the memory 206 may comprise a traffic routing module 208 used for adaptive traffic control based on weather condition. The traffic routing module 208 may comprise a weather adjustment module 210 for determine an appropriate course of action in response to a weather condition; a vehicle calibration module 212 for adjusting standard rules for optimizing the traffic timings, and a standard optimization module 214 for optimizing the traffic condition in a normal weather condition. The memory may further comprise a weather traffic correlation module 216 for determining an association of the weather condition to an adverse traffic event.

Figure 3:
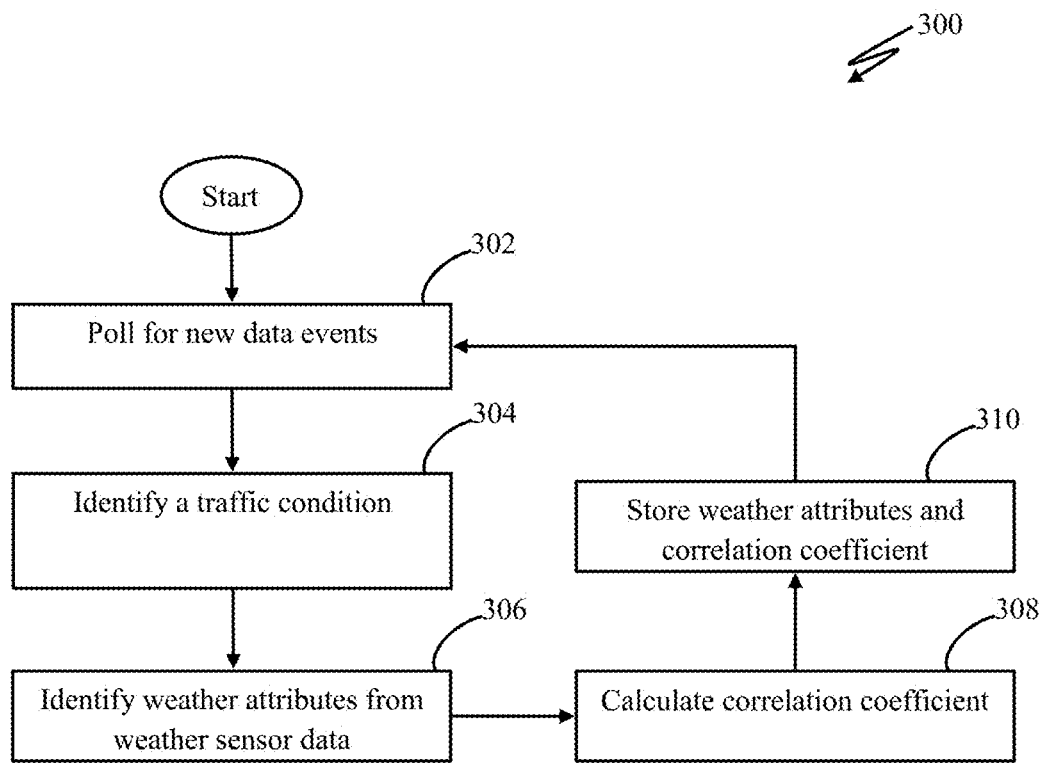
FIG. 3 is a flow diagram illustrating operations of a weather traffic correlation module of the system.

FIG. 3 is a flow diagram illustrating operations of a weather traffic correlation module of the system.

The weather traffic correlation module 216 functions as explained with reference to the flow diagram 300 illustrated in FIG. 3. The weather traffic correlation module 216 may continuously or periodically poll a camera 104 for visual data of vehicles crossing an intersection and weather sensors for determining current weather condition at the intersection, at step 302. The weather traffic correlation module 216 may identify a traffic condition at the intersection by using the visual data, at step 304. The weather traffic correlation module 216 may also determine current weather attributes using weather sensor data, at step 306. The weather sensor data may be obtained from weather sensors installed at the intersection. The traffic condition and the current weather attributes may be determined at the same time. Based on the weather attributes and traffic condition, the weather traffic correlation module 216 may determine a correlation coefficient and store the value of correlation coefficient in a weather traffic correlation database 108, at steps 308 and 310.

Figure 4A:
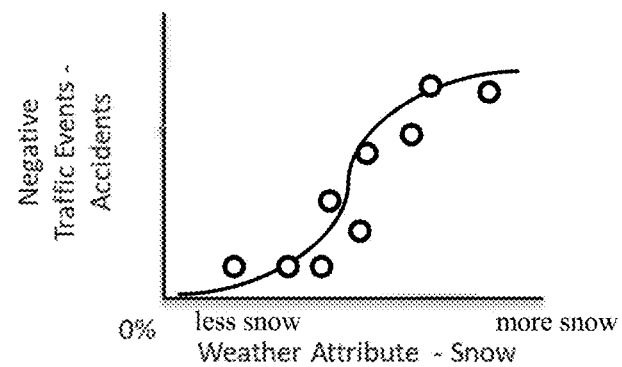
FIG. 4A illustrates a graphical representation of exemplary correlation between a snow weather attribute and adverse traffic events.

FIG. 4A illustrates a graphical representation of correlation between a snow weather attribute and adverse traffic events.

Figure 4B:
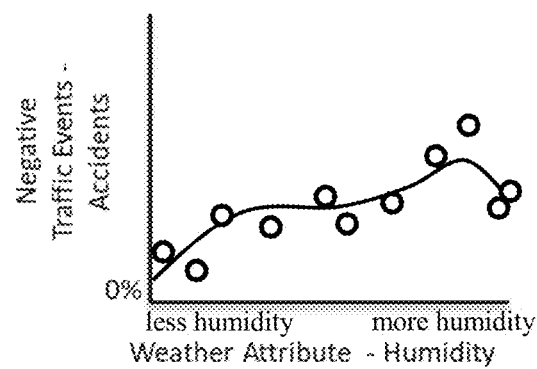
FIG. 4B illustrates a graphical representation of an exemplary correlation between a humidity weather attribute and adverse traffic events.

Calculation of the correlation coefficients is shown in FIG. 4A and FIG. 4B. The correlation coefficients may be calculated using comparison of one kind of weather attributes, such as snow with an adverse traffic event. A weather attribute (snow in FIG. 4A) may be correlated to an adverse traffic event (vehicular accidents in FIG. 4A). As evident from FIG. 4A, the snow increases probability of the vehicular accidents. This may be due to a fact that snow causes road surface to become slippery, thus causing a vehicle to skid.

FIG. 4B illustrates a graphical representation of correlation between a humidity weather attribute and adverse traffic events.

A weather attribute (humidity in FIG. 4B) may be correlated to the adverse traffic event (vehicular accidents in FIG. 4B). The humidity has a lesser effect on vehicular accidents as shown in FIG. 4B than the snow does as shown in FIG. 4B.

In some embodiment, the value of correlation coefficient may dependent on the intersection, and may be affected by variables, such as shape of roads, speed limits etc. Thus, the weather traffic correlation module 216 may learn over the time a trend in value of the correlation coefficient based on comparison with past records. The past records may relate to past weather conditions and associated adverse traffic events, wherein the past records may be stored in a historical traffic database 110. The historical traffic database 110 may be updated with new events related to weather condition and associated adverse traffic event.

Figure 5:
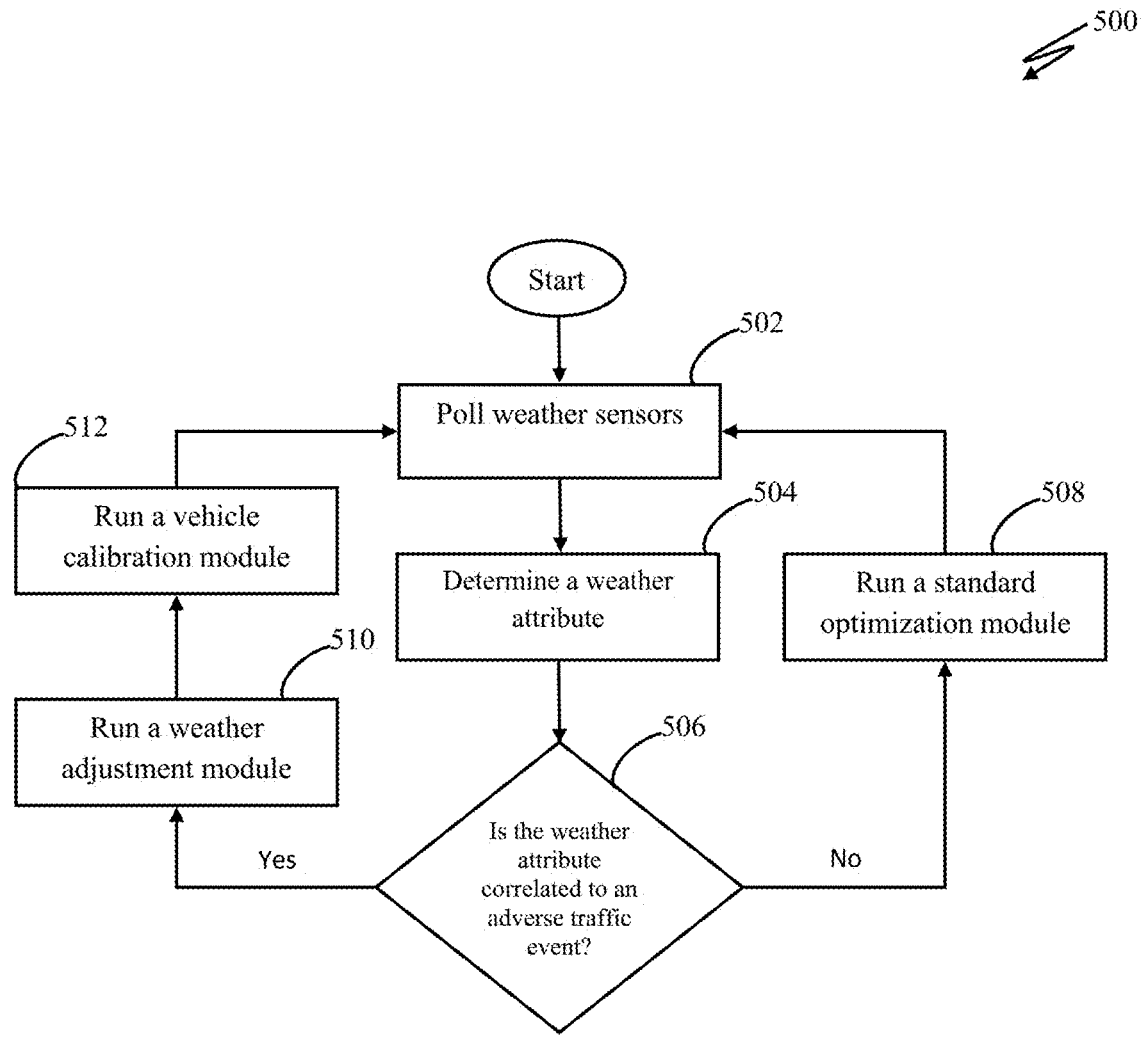
FIG. 5 is a flow diagram illustrating correlation of exemplary weather attributes and traffic events and traffic optimization by a traffic routing module of the system.

FIG. 5 is a flow diagram illustrating correlation of weather attributes and traffic events and traffic optimization by a traffic routing module of the system.

The traffic routing module 208 may function as shown in the flow diagram 500 of FIG. 5. The traffic routing module 208 may comprise three sub-modules weather adjustment module 210, vehicle calibration module 212, and standard optimization module 216. The traffic routing module 208 may optimize the movement of traffic at an intersection based on a current weather condition. The traffic routing module 208 may allow optimization of the traffic during different climate conditions, such as from normal to extreme climate conditions. In normal climate conditions or climate condition not associated with adverse traffic events, a standard optimization module 216 may be run to optimize the traffic movement at the intersection (see step 508)—that is, the traffic signal timings are optimized for standard or normal vehicle or traffic behavior.

There may be many approaches toward traffic control by regulating the timing schedule of the traffic signals. One such approach may be setting an upper limit time of a green light longer with an increase of a traffic volume on one side of a road. According to this method, the upper limit time of the green light may be extended as a traffic volume becomes heavier, which makes it possible to forestall occurrence of traffic jam in a case where traffic volume in one direction is far heavier than in any other direction. In some cases green lights may be timed to allow a particular vehicle or set of vehicles to keep moving through an intersection to prevent or alleviate traffic buildup, and/or because one or more of the vehicles are important to alleviate an emergency, as may be the case with ambulances, firefighter vehicles, police vehicles, or other emergency vehicles. Other times, such as in poor weather, red lights may be more frequent or prolonged to encourage drivers to drive more slowly, and durations of yellow lights may be prolonged to give drivers more leeway when they might not be able to stop as quickly due to lower tire traction. In some cases, timings may be adjusted so that one or more red lights may intentionally be given to a recklessly fast-driving vehicle to encourage the driver of the recklessly fast-driving vehicle to slow down.

The traffic routing module 208 may periodically poll weather sensors for determining weather attributes, at step 502. The weather attributes may be derived from weather sensor data obtained from the weather sensors or weather forecast data, at step 504. The traffic routing module 208 may query a weather traffic correlation database 108 to determine, if the weather attribute is known to have sufficient correlation with respect to an adverse traffic event, such as a fatal accident, at step 506. The sufficient correlation may be defined in terms of an arbitrarily defined thresholds values, such as a coefficient value being greater than 0.6. The threshold value may be predefined in the traffic routing module 208. For example, the threshold values may be set by an administrator of the system 102.

While the value of sufficient correlation is present below the threshold value, the standard optimization module 214 may be triggered at step 508. Otherwise, if the value of sufficient correlation exceeds the threshold value, the traffic routing module 208 may trigger the weather adjustment module 210, at step 510. The weather adjustment module 210 may determine current traffic condition at the intersection. Based on the current traffic condition and the weather attributes, the weather adjustment module 210 may suggest/implement appropriate measure to reduce risk of the adverse traffic event at the respective intersection, such as any of the adjustments described above. Vehicle calibration via vehicle calibration module 212, which is discussed further with respect to FIG. 7A, FIG. 7B, and FIG. 8, may be triggered at step 512. The vehicle calibration module 212 may be used to adjust standard rules for traffic control based on weather conditions. The traffic routing module 208 may again continuously or periodically poll for weather attributes at predefined time intervals at step 502.

Figure 6:
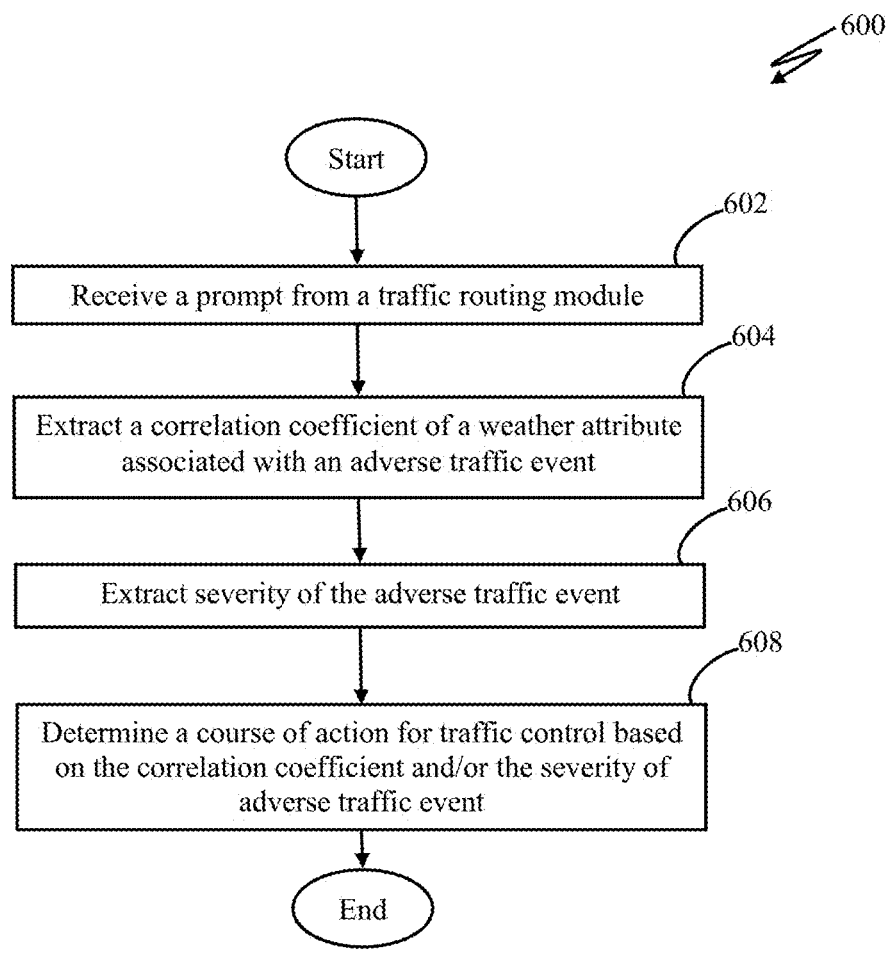
FIG. 6 is a flow diagram illustrating correlation of exemplary weather attributes and traffic events by a weather adjustment module of the system.

FIG. 6 is a flow diagram illustrating correlation of weather attributes and traffic events by a weather adjustment module of the system.

The weather adjustment module 210 may function as shown in the flow diagram 600 of FIG. 6. At first, the weather adjustment module 210 may be triggered by the traffic routing module 208, at step 602. The weather adjustment module 210 may be triggered when a weather attribute having increased probability to cause an adverse traffic event is detected. The weather adjustment module 210 may query a weather traffic correlation database 108 for extracting a correlation coefficient for the weather condition associated with the adverse traffic event, at step 604. Moreover, the weather adjustment module 210 may extract severity of the adverse traffic events, at step 606. Based on the assumption that when value of correlation coefficient exceeds a predefined threshold value, the current weather condition may pose a risk of adverse traffic event at the intersection. The weather adjustment module 210 may determine a suitable course of action to reduce the probability of the adverse traffic event, optionally based on the correlation coefficient and/or the severity of adverse traffic event, at step 608. The weather adjustment module 210 may determine the suitable course of action using data stored in a traffic adjustment rule database 112. The traffic adjustment rule database 112 may contain standard rules relating to traffic control in adverse weather conditions. The weather adjustment module 210 based on the weather attribute, adverse traffic event associated with the weather attribute and the degree of correlation coefficient may derive a suitable course of action. The traffic adjustment rule database 112 may be regularly updated with a current situation. The traffic routing module 208 may implement the course of action for traffic control at the respective intersection.

In an embodiment, the weather adjustment module 210 may use fuzzy rules for traffic optimization. It utilizes congestion data as input for deciding optimum action based on a set of fuzzy rules defined by an expert. For example, if the correlation coefficient lies between 0.6 and 0.85 and the associated adverse traffic event is "Minor accident" then the adjustments made by the weather adjustment module 210 may be a mild adjustment. Such a mild adjustment may be increasing the duration of yellow light. If the value of correlation coefficient is between 0.85 and 1.0 and the associated adverse traffic event is "Major accident with multiple injuries" then the course of action suggested by the weather adjustment module 210 may be commensurate with the risk. For example, in case of snow is detected at a specific intersection which is highly correlated to fatal (severe) accidents, then the traffic routing module 208 may suggest re-routing of the traffic. In an embodiment, timing schedules of one or more nearby traffic signals may also be adjusted to decrease the volume of traffic reaching the respective intersection.

Figure 7A:
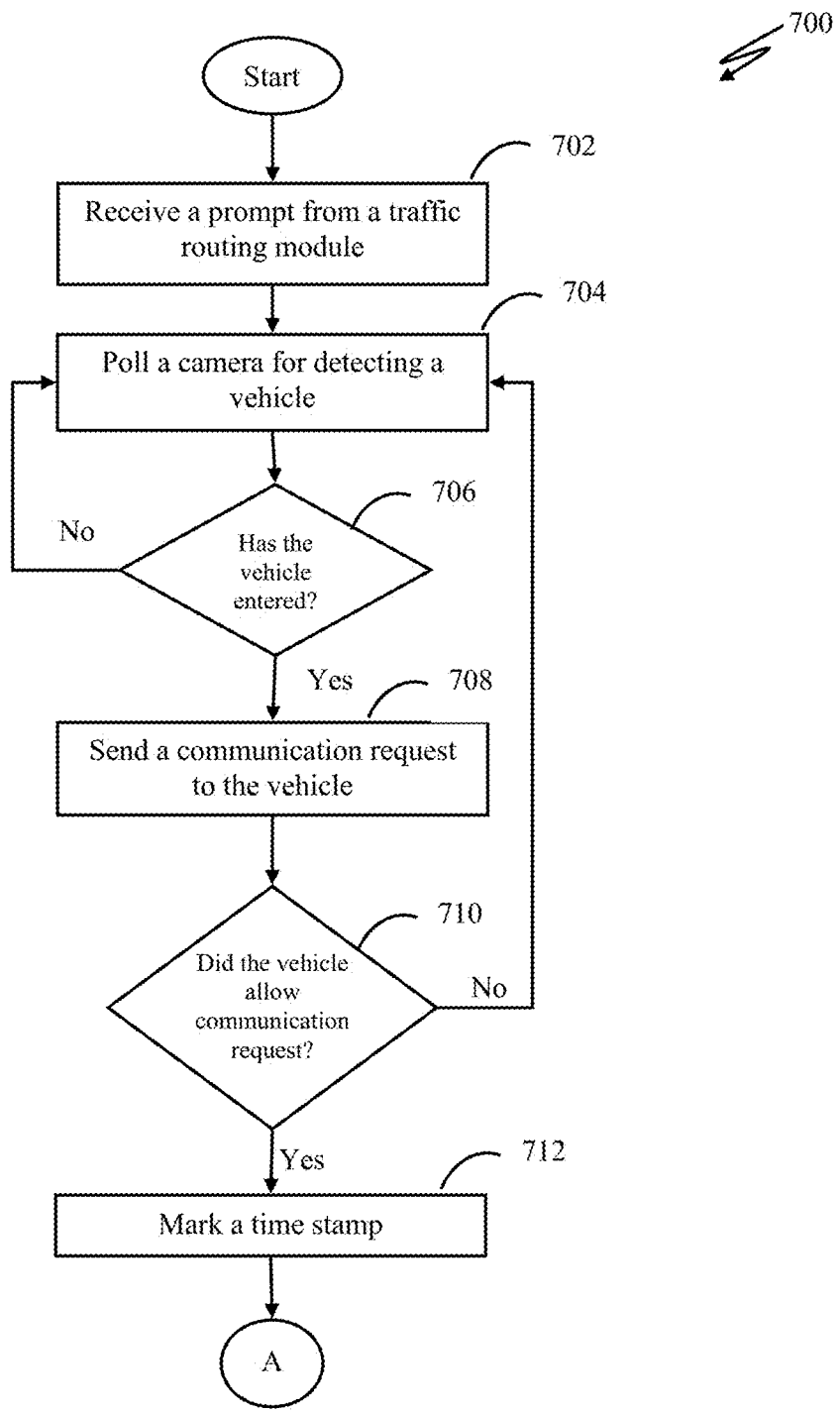
FIG. 7A is a first portion of a flow diagram illustrating vehicle and traffic detection, vehicle and traffic behavior analysis, and vehicle and traffic system rule adjustment.

FIG. 7A is a first portion of a flow diagram illustrating vehicle and traffic detection, vehicle and traffic behavior analysis, and vehicle and traffic system rule adjustment.

Figure 7B:
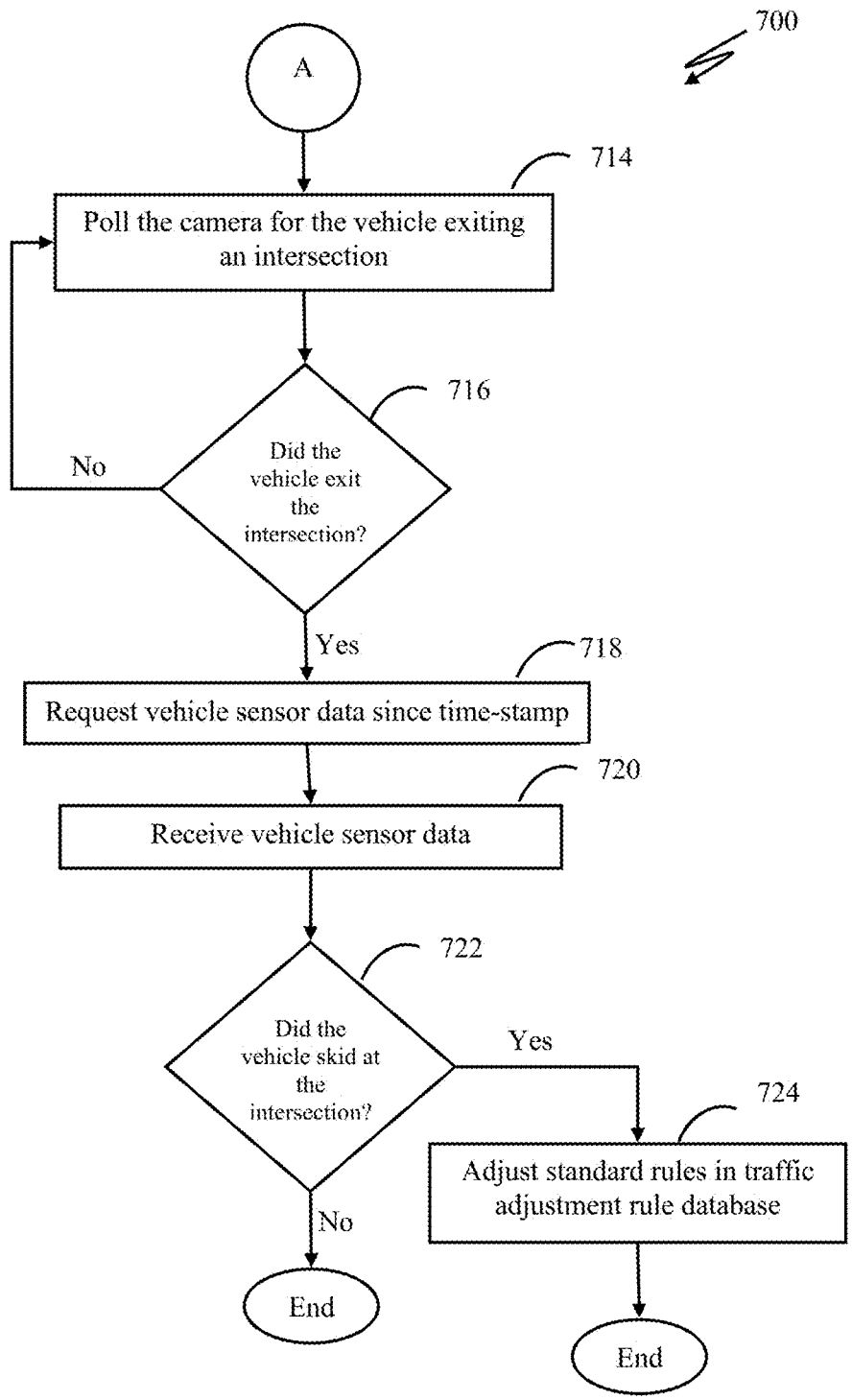
FIG. 7B is a second portion of the flow diagram of FIG. 7A illustrating vehicle and traffic detection, vehicle and traffic behavior analysis, and vehicle and traffic system rule adjustment.

The vehicle calibration module 212 may function as shown in the flowchart 700 shown in FIG. 7A and FIG. 7B. The vehicle calibration module 212 may be used to communicate with a vehicle 118, wherein the vehicle 118 may be approaching an intersection wherein a smart traffic control camera 104 is installed. The vehicle calibration module 212 may determine data related to an adverse traffic event or the probability of adverse traffic event. For example, the vehicle calibration module 212 may determine data related to skidding of the vehicle 118.

At first, the vehicle calibration module 212 may be triggered by the traffic routing module 208, at step 702. Successively, the vehicle calibration module 212 may poll the camera 104 to detect arrival of any vehicle in the field of view of the camera 104 (the defined area 134), at step 704. Arrival of the vehicle may be determined at step 706. In case, the vehicle 118 may be approaching the defined area 134 (e.g., an intersection), the vehicle calibration module 212 may send a communication request to the vehicle 118, at step 708. The vehicle is assumed to have suitable V2V, V2I, and/or V2V communication technologies such as dedicated short range communication (DSRC) wireless signal transfer or another wireless signal transfer protocol or technology discussed herein with respect to the input devices 1160 and/or output devices 1150 of FIG. 11.

Thereafter, acceptance of the communication request by the vehicle 118 may be determined, at step 710. In case, the vehicle 118 does not allow communication request, the vehicle calibration module 212 may poll the smart traffic control camera 104 for detecting another vehicle. If the communication request is accepted by the vehicle 118, a connection may be established with connected vehicle base module 122. The vehicle calibration module 212 may send a time-stamp to the connected vehicle base module 122, at step 712. The time-stamp may indicate a time of establishing communication with the vehicle 118.

FIG. 7B is a second portion of the flow diagram of FIG. 7A illustrating vehicle and traffic detection, vehicle and traffic behavior analysis, and vehicle and traffic system rule adjustment.

The vehicle calibration module 212 may poll the camera 104 to determine the time when the vehicle 118 exits the defined area 134 (e.g., intersection), at step 714. The exit of the vehicle from the defined area 134 may be checked at step 716.

On exiting the defined area 134, the vehicle calibration module 212 may request the connected vehicle base module 122 for vehicle sensor data, at step 720. The vehicle sensor data may be requested for an interval starting from the time-stamp and ending at the time when vehicle 118 exited the defined area 134. The vehicle sensor data may be used to check if a skid occurred during the interval, at step 722. In case, a skid occurred, the vehicle sensor data may be used to determine or update standard rules stored in the traffic adjustment rules database 112, at step 724.

In an embodiment, the vehicle sensor data may relate to skidding of the vehicle 118 in the defined area 134. The skidding may be determined by activation of ABS/Stability Control Systems equipped in the vehicle 118. The vehicle sensor data may be analyzed with a video feed of the vehicle 118 captured by the camera 104. The main objective of analysis may be to determine the cause of the skid—for example, whether the skid was due to weather condition or driver error. If the skid was due to the weather condition, suitable adjustments to the standard rules in traffic adjustment rules database 112 may be made. For example, the local adjustment in standard rules for the current conditions may be adjusted to increase or decrease a time duration of a particular traffic signal output (green, yellow, green) by a particular predefined amount or by a particular predefined percentage, such as 10% or 5% or 1%. The local adjustment is how much more significant the compensation for the weather conditions will be at a specific traffic cabinet based upon how that weather condition effects that specific intersection/road. Adjustments may also be non-linear, non-predefined, and/or dynamic based upon the specific attributes of the skid. For example, determining how much of the skid was due to user error, such as excess speed or late braking, or the severity of the skid.

Figure 8:
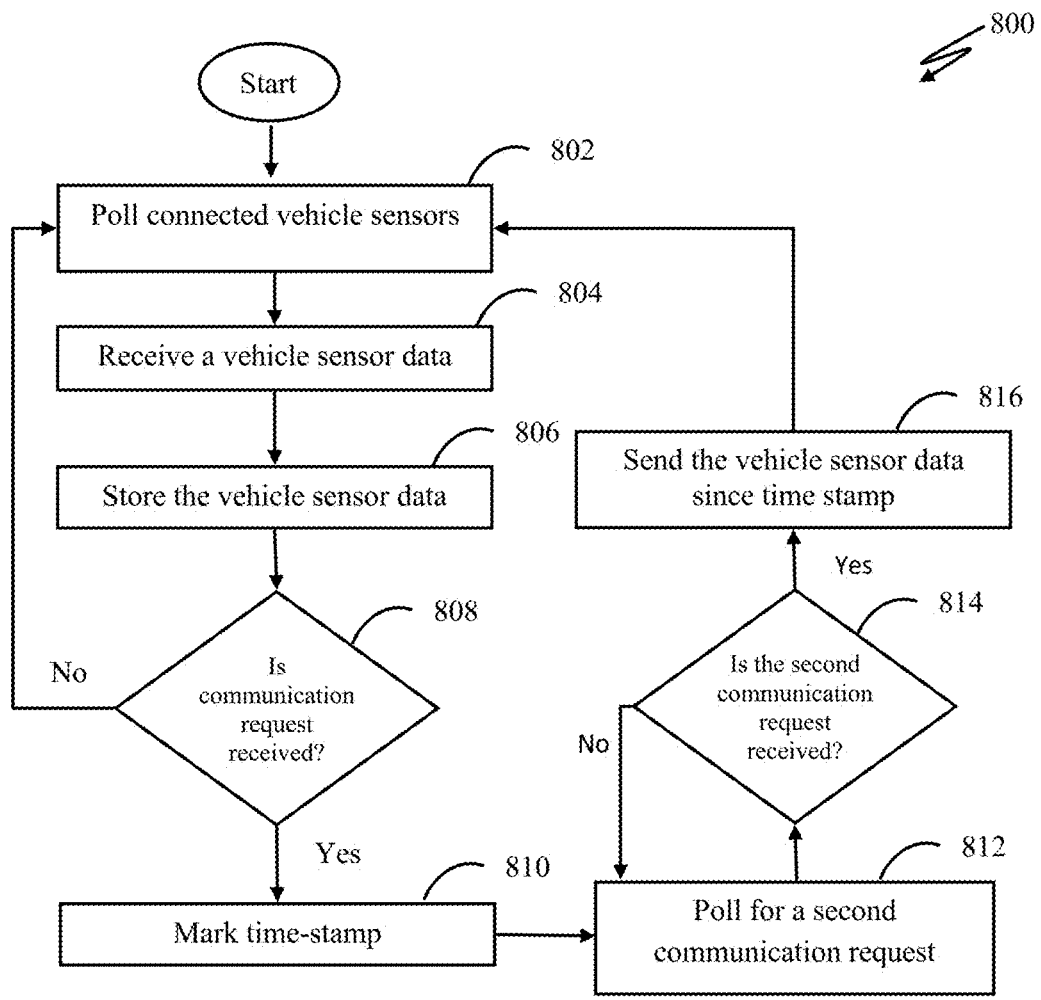
FIG. 8 is a flow diagram illustrating communication operations performed by a connected vehicle base module of a vehicle.

FIG. 8 is a flow diagram illustrating communication operations performed by a connected vehicle base module of a vehicle.

The connected vehicle base module 122 may function as shown in the flow diagram 800 of FIG. 8. The connected vehicle base module 122 may be used to determine the vehicle sensor data from connected vehicle sensors 124. At first, connected vehicle base module 122 may poll the vehicle sensors 124 for vehicle sensor data, at step 802. The connected vehicle base module 122 may receive the vehicle sensor data from one or more connected vehicle sensors 124, at step 804. The vehicle sensor data may be stored in a connected vehicle sensor data database 120, at step 806. The connected vehicle base module 122 may poll the sensor for vehicle sensor data, such as engaging the vehicle's brake, engaging of ABS, or GPS position of the vehicle 118. The connected vehicle base module 122 may receive a communication request from the system 102. Acceptance of the communication request may be checked, at step 808. In case, a communication request is received, the connected vehicle base module 122 may record a time of receiving the request, i.e. timestamp in the connected vehicle sensor data database 120, at step 810. Thereafter, the connected vehicle base module 122 may poll for a second communication request from the system 102, at step 812. Generally, the second communication request may be sent by the system 102 when the vehicle 118 is about to exit the intersection. Receiving of the second communication request may be checked, at step 814. In case, the second communication request is received, the connected vehicle base module 122 may send the vehicle sensor data for an interval of time starting from the timestamp to the time of receiving the second request, at step 816. The connected vehicle base module 122 may continuously poll the connected vehicle sensors 124 in a predetermined interval.

Figure 9:
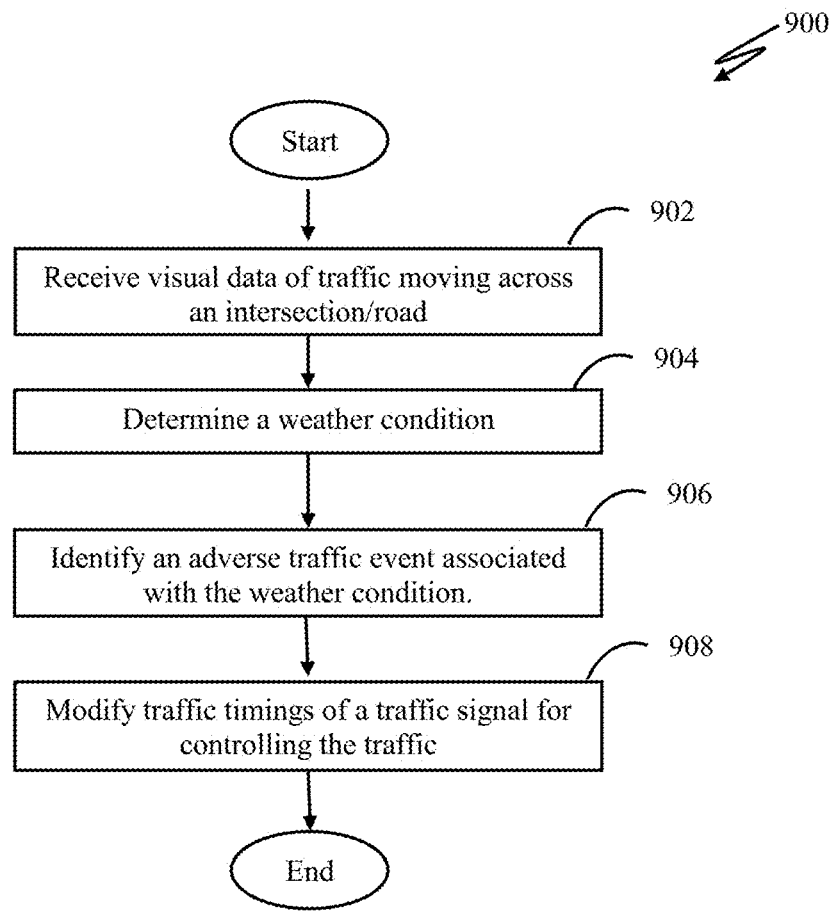
FIG. 9 is a flow diagram illustrating adaptive traffic control based on weather conditions.

FIG. 9 is a flow diagram illustrating adaptive traffic control based on weather conditions.

The flow diagram 900 of FIG. 9 shows the architecture, functionality, and operation of system 102. At step 902 of the flow diagram 900, visual data of traffic moving across an intersection of roads may be received. The visual data may comprise images or videos captured by a camera 104 present at a traffic signal.

At step 904, a weather condition at the intersection may be determined. The weather condition may be determined from weather data. The weather data may be obtained from weather sensors connected to a traffic signal or a weather database.

At step 906, an adverse traffic event known to be associated with the weather condition may be identified. The adverse traffic event may be identified in a weather traffic correlation database. The weather traffic correlation database may include details related to past adverse traffic events associated with different weather conditions.

At step 908, traffic timings of the traffic signal may be adjusted for controlling the traffic at the intersection. The adjustments may be made based on the visual data, the weather condition, and the adverse traffic event.

Figure 10:
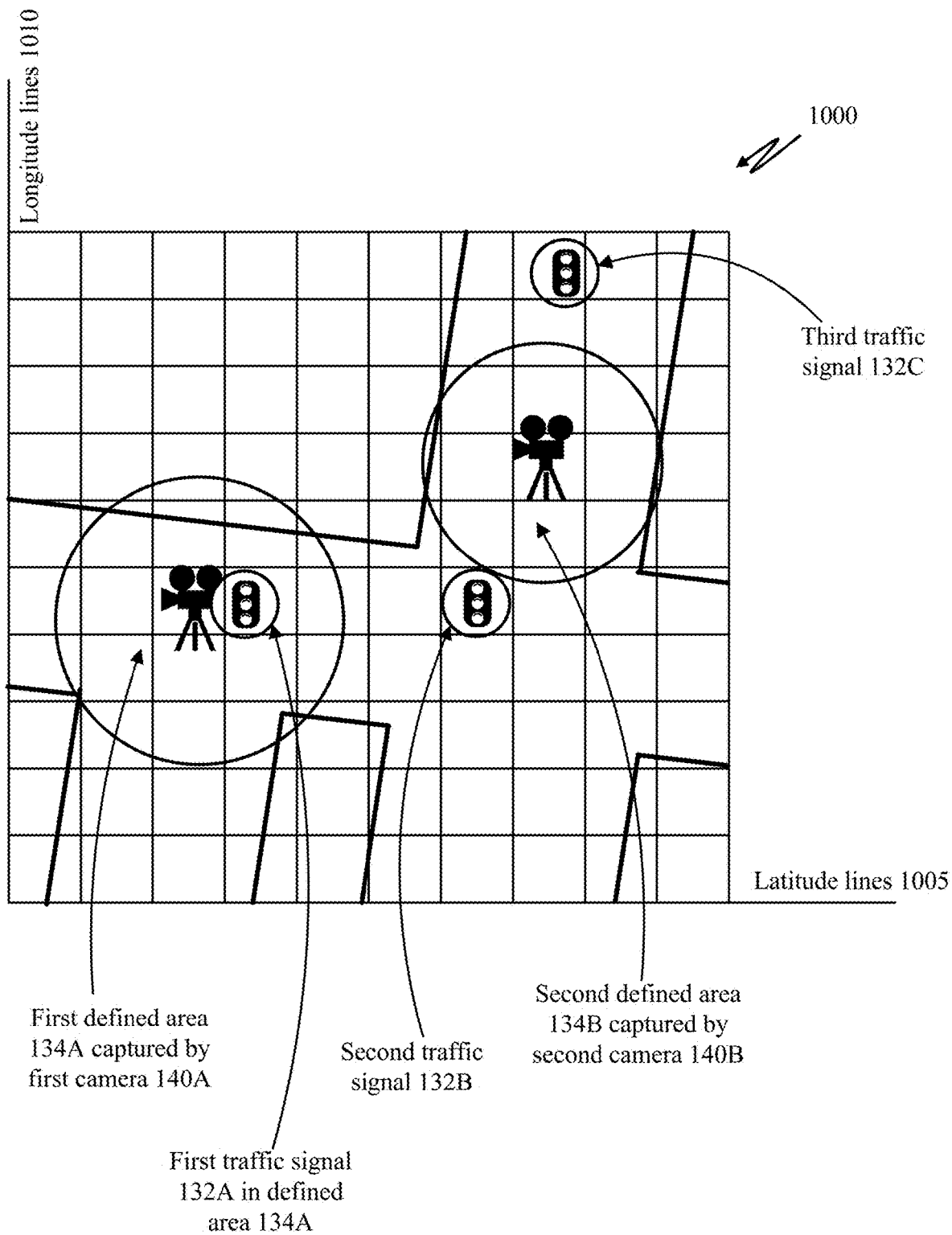
FIG. 10 illustrates a latitude and longitude positioning identifying several roads with several defined areas monitored by several cameras, and with several controlled traffic signals.

FIG. 10 illustrates a latitude and longitude positioning identifying several roads with several defined areas monitored by several cameras, and with several controlled traffic signals.

The grid 1000 includes horizontal latitude lines 1005 and vertical longitude lines 1010. The distance between each horizontal latitude lines 1005 and between each vertical longitude lines 1010 may be any distance, and in this case may for example be a less than ten meters or less than one meter.

The grid 1000 identifies multiple roads with two intersections—a "T" intersection and a four-way intersection. The grid 1000 identifies a first defined area 134A captured by first camera 140A at the "T" intersection, and identifies that a first traffic signal 132A is in the first defined area 134A. Any adverse weather conditions, such as snow or rain, or adverse traffic issues, such as high traffic or an accident, at this intersection 134A, noticed by analysis of visual media captured by camera 104A, may be remedied by alterations to timing of the first traffic signal 132A.

The four-way intersection includes a second traffic signal 132B but is not directly monitored by any camera 104. Instead, a second defined area 134B captured by second camera 140B is just northeast of the four-way intersection including the second traffic signal 132B. The four-way intersection including the second traffic signal 132B is also fairly close to (just southwest of) the first defined area 134A captured by first camera 140A. Thus, traffic signal timings of the second traffic signal 132B may be modified based on any adverse weather conditions and/or adverse traffic issues in the first defined area 134A noticed by analysis of visual media captured by first camera 104A, any adverse weather conditions and/or adverse traffic issues in the second defined area 134B noticed by analysis of visual media captured by first camera 104B, or any combination thereof. In some cases, the signal timings of the first traffic signal 132A may also be influenced by any adverse weather conditions and/or adverse traffic issues in the second defined area 134B noticed by analysis of visual media captured by first camera 104B.

A third traffic signal 132C is just northeast of the second defined area 134B captured by second camera 140B. Traffic signal timings of the third traffic signal 132C may be modified based on any adverse weather conditions and/or adverse traffic issues in the first defined area 134A noticed by analysis of visual media captured by first camera 104A, any adverse weather conditions and/or adverse traffic issues in the second defined area 134B noticed by analysis of visual media captured by first camera 104B, or any combination thereof. In some cases, the traffic signal timings may be modified based on multiple factors, but more heavily weighted to factors observed more close to the location of the traffic signal being modified and/or calibrated. For example, if an adverse weather condition or traffic issue (or lack thereof) is observed in the second defined area 134B via the second camera 104B, this may be weighted more highly (e.g., via a multiplier) as a basis for modifying the traffic signal timings of the third traffic signal 132C than an adverse weather condition or traffic issue (or lack thereof) observed in the first defined area 134A via the first camera 104A because the second defined area 134B is closer to the third traffic signal 132C than the first defined area 134A is. Such a system may reduce the probability of adverse traffic events, such as accidents occurring due to weather conditions or adverse traffic conditions/events.

Figure 11:
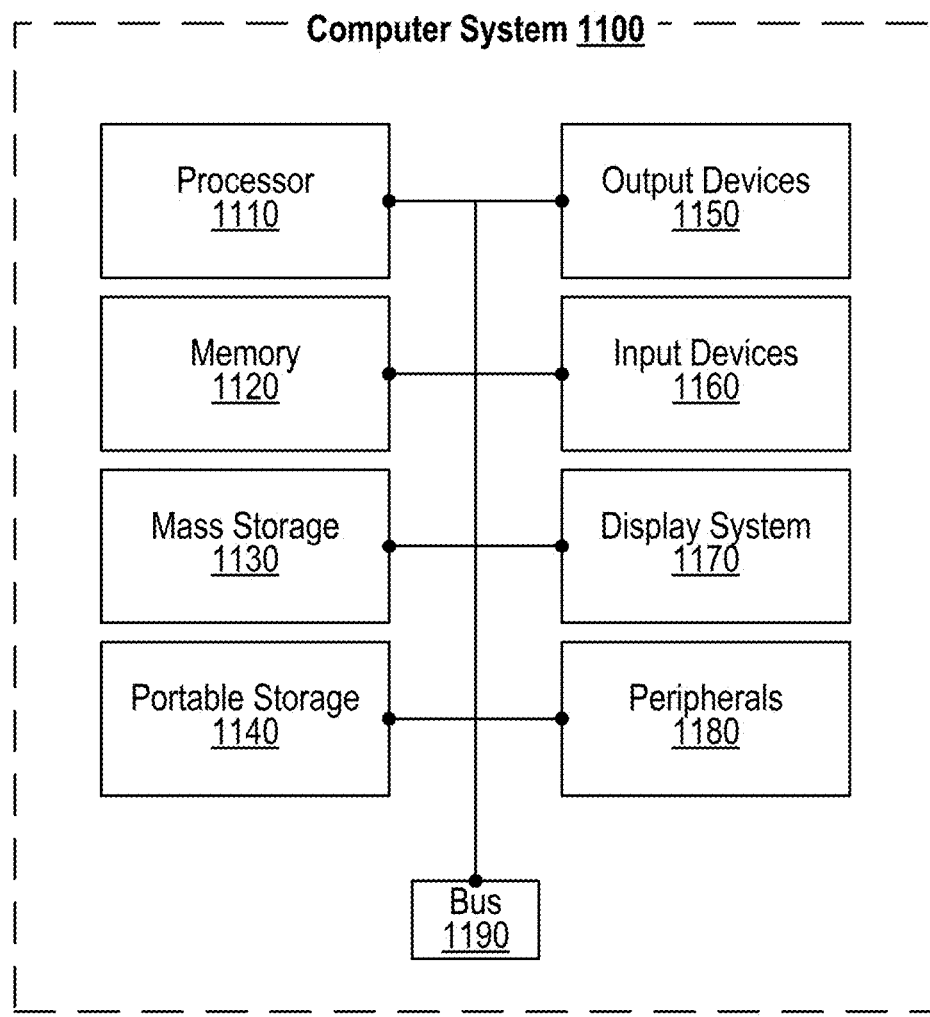
FIG. 11 is a block diagram of an exemplary computing device that may be used to implement some aspects of the traffic control technology.

FIG. 11 illustrates an exemplary computing system 1100 that may be used to implement some aspects of the adaptive traffic control technology. For example, any of the computing devices, computing systems, network devices, network systems, servers, and/or arrangements of circuitry described herein may include at least one computing system 1100, or may include at least one component of the computer system 1100 identified in FIG. 11. The computing system 1100 of FIG. 11 includes one or more processors 1110 and memory

1120. Each of the processor(s) 1110 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1110 may include one or more cores, either integrated onto a single chip or spread across multiple chips connected or coupled together. Memory 1120 stores, in part, instructions and data for execution by processor 1110. Memory 1120 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing some aspects of the subject technology for purposes of loading that software into memory 1120.

Portable storage device 1140 operates in conjunction with a portable non-volatile storage medium, such as a floppy disk, compact disk or Digital video disc, to input and output data and code to and from the computer system 1100 of FIG. 11. The system software for implementing aspects of the subject technology may be stored on such a portable medium and input to the computer system 1100 via the portable storage device 1140.

The memory 1120, mass storage device 1130, or portable storage 1140 may in some cases store sensitive information, such as transaction information, health information, or cryptographic keys, and may in some cases encrypt or decrypt such information with the aid of the processor 1110. The memory 1120, mass storage device 1130, or portable storage 1140 may in some cases store, at least in part, instructions, executable code, or other data for execution or processing by the processor 1110.

Output devices 1150 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1170. The printer may be inkjet, laserjet, thermal, or some combination thereof. In some cases, the output device circuitry 1150 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1150 may include any ports, plugs, antennae, wired or wireless transmitters, wired or wireless transceivers, or any other components necessary for or usable to implement the communication types listed above, such as cellular Subscriber Identity Module (SIM) cards.

Input devices 1160 may include circuitry providing a portion of a user interface. Input devices 1160 may include an alpha-numeric keypad, such as a keyboard, for inputting alpha-numeric and other information, or a pointing device, such as a mouse, a trackball, stylus, or cursor direction keys. Input devices 1160 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1160 may include any ports, plugs, antennae, wired or wireless receivers, wired or wireless transceivers, or any other components necessary for or usable to implement the communication types listed above, such as cellular SIM cards.

Input devices 1160 may include receivers or transceivers used for positioning of the computing system 1100 as well. These may include any of the wired or wireless signal receivers or transceivers. For example, a location of the computing system 1100 can be determined based on signal strength of signals as received at the computing system 1100 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1100 such as a router, modem, switch, hub, bridge, gateway, or repeater. These may also include Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1160 may include receivers or transceivers corresponding to one or more of these GNSS systems.

Display system 1170 may include a liquid crystal display (LCD), a plasma display, an organic light-emitting diode (OLED) display, an electronic ink or "e-paper" display, a projector-based display, a holographic display, or another suitable display device. Display system 1170 receives textual and graphical information, and processes the information for output to the display device. The display system 1170 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1180 may include any type of computer support device to add additional functionality to the computer system. For example, peripheral device(s) 1180 may include one or more additional output devices of any of the types discussed with respect to output device 1150, one or more additional input devices of any of the types discussed with respect to input device 1160, one or more additional display systems of any of the types discussed with respect to display system 1170, one or more memories or mass storage devices or portable storage devices of any of the types discussed with respect to memory 1120 or mass storage 1130 or portable storage 1140, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1100 of FIG. 11 can include those typically found in computer systems that may be suitable for use with some aspects of the subject technology and represent a broad category of such computer components that are well known in the art. That said, the computer system 1100 of FIG. 11 can be customized and specialized for the purposes discussed herein and to carry out the various operations discussed herein, with specialized hardware components, specialized arrangements of hardware components, and/or specialized software. Thus, the computer system 1100 of FIG. 11 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1100 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1100 may also use a Basic Input/Output System (BIOS) or Unified Extensible Firmware Interface (UEFI) as a layer upon which the operating system(s) are run.

In some cases, the computer system 1100 may be part of a multi-computer system that uses multiple computer systems 1100, each for one or more specific tasks or purposes. For example, the multi-computer system may include multiple computer systems 1100 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1100 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1120, the mass storage 1130, the portable storage 1140, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L11), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1110 for execution. A bus 1190 carries the data to system RAM or another memory 1120, from which a processor 1110 retrieves and executes the instructions. The instructions received by system RAM or another memory 1120 can optionally be stored on a fixed disk (mass storage device 1130/portable storage 1140) either before or after execution by processor 1110. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1100 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of adaptive traffic control, the method comprising:
    receiving visual media data from a camera, the visual media data depicting vehicular traffic along a thoroughfare in a defined area;
    receiving weather data based on sensor information from one or more sensors;
    identifying a weather condition regarding weather in the defined area based on the weather data;
    identifying a correlation of an adverse traffic event in the past along the thoroughfare with weather data correlated with the weather condition; and
    modifying traffic signal timing of a traffic signal based on the weather data, current vehicular traffic, the visual media data, and the correlation of the adverse traffic event in the past to reduce risk of the adverse traffic event happening again because of the weather data.

2. The method of claim 1, further comprising calculating an optimal traffic signal timing that minimizes any need for velocity change by a first vehicle traveling along the thoroughfare based on location data received from at least the first vehicle, wherein modifying the traffic signal timing of the traffic signal includes implementing the optimal traffic signal timing at the traffic signal.

3. The method of claim 1, wherein modifying the traffic signal timing of the traffic signal includes encouraging one or more vehicles to slow down using a change in output of the traffic signal.

4. The method of claim 1, wherein modifying the traffic signal timing of the traffic signal includes modifying a duration of a yellow light signal output at the traffic signal.

5. The method of claim 1, wherein the one or more sensors include the camera and the sensor information includes the visual media data received from the camera, wherein identifying the weather condition based on the weather data includes identifying the weather condition based on one or more features recognized via feature recognition within the visual media data received from the camera.

6. The method of claim 1, wherein the weather data includes a weather forecast generated based on the sensor information, and wherein the weather condition is predicted in the weather forecast.

7. The method of claim 1, wherein the weather condition includes a layer of a substance covering at least a portion of the thoroughfare in the defined area.

8. The method of claim 1, wherein the adverse traffic event is associated with a decrease in tire traction.

9. The method of claim 1, further comprising modifying traffic signal timing of one or more additional traffic signals other than the traffic signal in response to identifying the weather condition, thereby mitigating the adverse traffic event.

10. The method of claim 1, wherein at least one of the one or more sensors measures moisture in at least one location in the area.

11. A system for adaptive traffic control, the system comprising:
    a camera configured to capture visual media data depicting vehicular traffic along a thoroughfare in a defined area;
    a memory storing instructions; a processor configured to execute the instructions, wherein execution of the instructions causes the processor to:
    identify weather data based on sensor information from one or more sensors,
    identify a weather condition regarding weather in the defined area based on the weather data,
    identify a correlation of a traffic event in the past with the weather condition, and
    generate a new traffic signal timing of a traffic signal, the new traffic signal timing based on the weather data, current vehicular traffic, the visual media data, and the correlation of the traffic event in the past; and
    a traffic signal connector communicatively coupled with the traffic signal, wherein the traffic signal connector is configured to send information to the traffic signal to cause the traffic signal to modify traffic signal timing of the traffic signal to the new traffic signal timing to reduce risk of the traffic event happing again because of the weather data.

12. The system of claim 11, wherein the execution of the instructions causes the processor to generate the new traffic signal timing to minimize any need for velocity change by a first vehicle traveling along the thoroughfare based on location data received from at least the first vehicle.

13. The system of claim 11, wherein the execution of the instructions causes the processor to generate the new traffic signal timing to encourage a first vehicle to slow down by changing an output of the traffic signal before the first vehicle reaches an area associated with the traffic signal.

14. The system of claim 11, wherein the execution of the instructions causes the processor to generate the new traffic signal timing to modify a duration of a yellow light signal output at the traffic signal.

15. The system of claim 11, wherein the one or more sensors include the camera and the one or more sensors are configured to include, in the sensor information, the visual media data received from the camera, wherein, to identify the weather condition based on the weather data, the execution of the instructions causes the processor to include identifying the weather condition based on one or more features recognized via feature recognition within the visual media data received from the camera.

16. The system of claim 11, further comprising the one or more sensors, wherein at least one of the one or more sensors is configured to measure moisture at at least one location in the area.

17. The system of claim 11, wherein the execution of the instructions causes the processor to:
    determine, from the weather data, a weather forecast generated based on the sensor information, and
    identify the weather condition from a prediction in the weather forecast.

18. A non-transitory computer readable storage medium having embodied thereon a program, wherein the program is executable by a processor to perform a method of adaptive traffic control, the method comprising:
    receiving visual media data from a camera, the visual media data depicting vehicular traffic along a thoroughfare in a defined area;
    receiving weather data based on sensor information from one or more sensors;
    identifying a weather condition regarding weather in the defined area based on the weather data;
    identifying a correlation of an adverse traffic event in the past along the thoroughfare with weather data correlated with the weather condition; and
    modifying traffic signal timing of a traffic signal based on the weather data, current vehicular traffic, the visual media data, and the correlation of the adverse traffic event in the past to reduce risk of the adverse traffic event happening again because of the weather data.

19. The method of claim 1, further comprising identifying a severity of the weather condition based on the weather data, wherein modifying the traffic signal timing of the traffic signal is based on the identified severity of the weather condition.

20. The method of claim 11, wherein execution of the instructions further causes the processor to:
    identify a severity of the weather condition based on the weather data, and
    modify the traffic signal timing of the traffic signal based on the identified severity of the weather condition.

* * * * *